Feb. 26, 1957 M. D. NELSON 2,783,396

HIGH VOLTAGE SUPPLIES

Filed Sept. 24, 1954 2 Sheets-Sheet 1

INVENTOR.
MORRIS D. NELSON
BY
[signature]
ATTORNEY

Feb. 26, 1957 M. D. NELSON 2,783,396
HIGH VOLTAGE SUPPLIES
Filed Sept. 24, 1954 2 Sheets-Sheet 2

INVENTOR.
MORRIS D. NELSON
BY [signature]
ATTORNEY

United States Patent Office 2,783,396

Patented Feb. 26, 1957

2,783,396

HIGH VOLTAGE SUPPLIES

Morris D. Nelson, New York, N. Y., assignor to Radio Corporation of America, a corporation of Delaware Application September 24, 1954, Serial No. 458,184

9 Claims. (Cl. 307—150)

This invention relates generally to voltage supplies and more particularly to voltage supplies of the type suitable for use in satisfying the high voltage requirements of a cathode ray tube.

It has been usual practice in the monochrome television art to obtain the high voltages required by a receiver kinescope from a pulse type supply, developing the high voltages via rectification of the transient "flyback" pulses appearing across the receiver's horizontal output transformer during retrace periods of the line scanning cycle. Direct adaptation of such supplies to use in color television receivers has not generally been fully satisfactory, for with color kinescopes of the types presently known, the high voltage requirements are generally of greater magnitude, more critical as to regulation, and over all present a significantly more complex problem than the monochrome kinescope high voltage supplies. As an example, a presently available 21" tri-color kinescope, of the shadow-mask type and incorporating the use of electromagnetic beam convergence apparatus, requires a well regulated voltage of approximately 27,000 volts for its ultor electrode (i. e. its final accelerating electrode), and a similarly well regulated voltage adjustable in a range about approximately 4,000 volts for the individual focusing electrodes of the tube's three electron guns.

The present invention is directed toward a high voltage supply, of a type suitable for satisfying such high voltage requirements as indicated above, in which a minimum tube complement may be employed without imposing unduly severe demands on the horizontal output tube, the horizontal output transformer, or the rectifying tubes employed. In accordance with the invention, a first rectifier is employed to rectify flyback pulses developed in the horizontal output transformer to provide a D.-C. voltage of a first magnitude somewhat higher than the required focus voltage. The required adjustable focus voltage is derived from the output of this first rectifier. The D.-C. output of the first rectifier is also added to stepped-up flyback pulses derived from the horizontal output transformer and the sum applied to a second rectifier, the output of which serves as the required ultor voltage.

In accordance with one embodiment of the present invention, the horizontal output transformer is provided with a secondary winding adapted to develop flyback pulses of a peak potential corresponding substantially to the difference between the D.-C. output of the first rectifier and the required ultor voltage. The D.-C. output of the first rectifier is applied via this secondary winding to the input electrode of the second rectifier, the D.-C. output of the second rectifier thus being brought up to the required ultor voltage level. In accordance with another embodiment of the present invention the flyback pulses developed across the primary of the horizontal output transformer, in addition to the D.-C. output of the first rectifier, are added to the flyback pulses developed across the secondary winding to bring the D.-C. output of the second rectifier to the required ultor voltage level.

Thus, in accordance with the present invention, a two-rectifier arrangement may supply both the focus and ultor voltages required by a color kinescope. As particularly adapted to supply the kinescope voltages indicated above, 27 kilovolts may be supplied to the kinescope ultor electrode by a supply in which the peak inverse voltages on the two rectifiers employed are only 7 kv. and 20 kv., respectively.

It will be appreciated that the described two-tube voltage supplies embodying the principles of the present invention represent a saving of at least one rectifier with respect to various voltage doubler arrangements heretofore proposed for use in meeting the severe high voltage requirements of a color kinescope. It will also be appreciated that reduction of peak inverse voltage strain on the rectifiers employed is a desirable advantage to use of embodiments of the present invention over more conventional supplies, since smaller, more inexpensive tubes may serve as the supply rectifiers.

A primary object of the present invention is thus to provide a novel and improved high voltage supply.

A further object of the present invention is to provide a novel and improved voltage supply suitable for use in satisfying the high voltage requirements of a color kinescope.

An additional object of the present invention is to provide a color television receiver with a novel and improved high voltage supply having a minimum tube complement.

Another object of the present invention is to provide a color kinescope high voltage supply in which the peak inverse voltage strain on the rectifiers employed is minimized.

Other objects and advantages of the present invention will be apparent to those skilled in the art after a reading of the following detailed description of embodiments thereof, and an inspection of the accompanying drawings in which.

Figure 1:
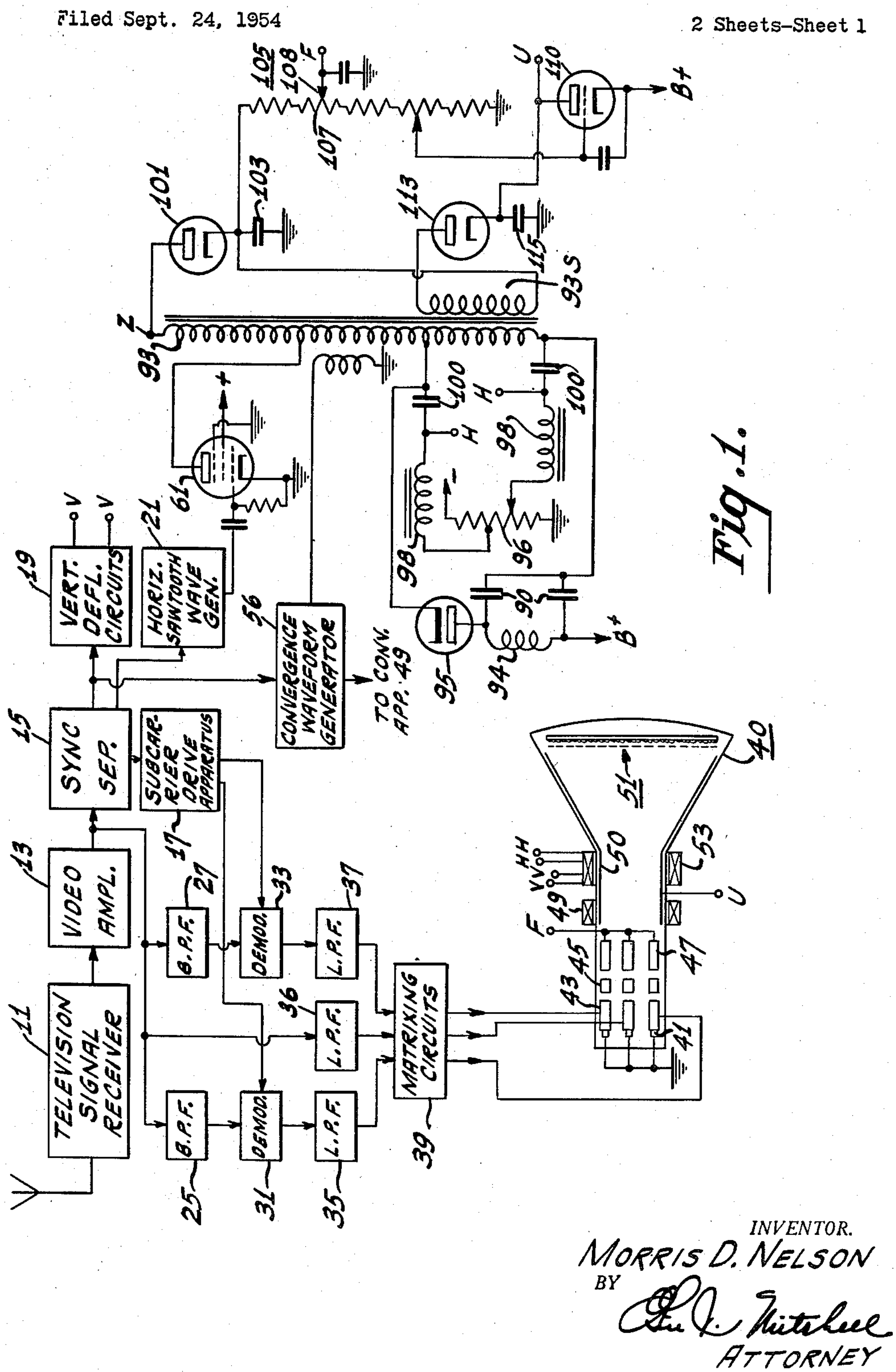
Figure 1 illustrates schematically a high voltage supply in accordance with an embodiment of the present invention, the supply being shown as supplying the high voltages required by a color kinescope in a typical color television receiver illustrated in block and schematic form.

Referring to Figure 1 more specifically, a high voltage supply in accordance with an embodiment of the present invention is illustrated as supplying the high voltages required by a color kinescope 40 in a typical color television receiver adapted to utilize color television signals in accordance with the FCC standards. The color television receiver illustrated essentially in block form in Figure 1 is in general accord with the principles and apparatus discussed in the article entitled "Principles and development of color television systems" by G. H. Brown and D. G. C. Luck appearing in the June 1955 issue of the RCA Review. Carrier wave modulated by a composite color picture signal are illustrated as being received by conventional signal receiving apparatus 11, which may include the usual R. F. tuner, frequency converting apparatus, I. F. amplifier, second detector, etc. The video frequency signals recovered from the modulated carrier in the receiving apparatus 11 are amplified in the video amplifier 13. Synchronizing information is derived from the recovered signals in the sync separator 15 and utilized to synchronously control the receiver's subcarrier drive apparatus 17, to control the generation of vertical scanning waves in the vertical deflection circuits 19, and control the generation of horizontal frequency sawtooth voltage waves in the horizontal sawtooth wave generator 21.

Respective color mixture signals (e. g. narrow band $E_Q$ signals and wider band $E_I$ signals, discussed in detail in the aforementioned article) are recovered from the video signal output of amplifier 13 in respective color demodulator channels which include bandpass filters 25 and 27 of respectively appropriate passbands, synchronous demodulators 31 and 33 receiving respectively appropriate phases of the output of the subcarrier drive apparatus 17, and low pass filters 35 and 37 having the respectively appropriate narrow and wider responses. The receiver is also provided with a brightness channel, including a low pass filter 36 having the desired wide band response, through which the broad band monochrome portion of the composite picture signal may pass. The outputs of the brightness channel and two color channels are suitably combined in the matrixing circuits 39 of the receiver to obtain the simultaneous color signals which may be applied to appropriate beam control elements of the color image reproducer 40.

The color image reproducer 40 is illustrated schematically as one of the three-gun, shadow-mask kinescope type. Color image reproducers of this general type are discussed in some detail in the article by H. B. Law entitled "A three-gun shadow-mask kinescope," appearing in the October 1951 issue of the Proceedings of the I. R. E. In a color image reproducer of this type, three electron beams are used, one for each primary color. The beams strike a phosphor screen composed of a regular array of red-, green-, and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Associated with each of the phosphor dot trios is a hole in the equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated the three electron beams are developed and shaped in respective electron gun structures, each including a thermionic cathode 41, a control grid 43, a first anode or accelerating electrode 45, and a focusing electrode 47. The electron gun structures may be disposed symmetrically about the tube axis so as to produce three substantially parallel beams, or may be inclined at respective angles to the tube axis so as to provide three beams substantially converging at a common point on the target.

A convergence yoke 49 is illustrated, which when energized by suitable dynamic convergence waveforms generated in the beam convergence circuits 56 along with an appropriate (static convergence) D.-C. component, serves to converge the three beams to a common point in the plane of the shadow-mask of target structure 51 throughout the scanning of the raster. The principles of multibeam convergence, and a description of typical circuits for developing dynamic convergence waveforms from sawtooth waves of field and line frequency may be found in an article by Albert W. Friend appearing in the October 1951 issue of the Proceedings of the I. R. E. and entitled "Deflection and convergence in color kinescopes." As illustrated, the beam convergence circuits may derive the respective sawtooth information from the vertical deflection circuits 19 and the horizontal output transformer 93, and convert these sawtooth waves into essentially parabolic waveforms, as disclosed in the aforementioned Friend article, for combined application with a D.-C. component as suitable convergence current waveforms to the convergence yoke 49. While the use of electromagnetic convergence apparatus has thus been illustrated, it will be appreciated that electrostatic convergence apparatus may alternatively be employed. It may also be noted that in lieu of a common convergence yoke 49, the beam convergence apparatus may involve separate control of the individual beams, comprising apparatus such as that disclosed in U. S. Patent No. 2,677,779, Goodrich, issued May 4, 1954. Particularly if electrostatic convergence apparatus is employed, the dynamic convergence waveforms developed by generator 56, may also be applied (suitably modified in amplitude) to the focus electrodes 47 to maintain essentially optimum focus throughout the entire raster, as suggested in the aforementioned Friend article. Three beam alignment magnets (not illustrated), one associated with each of the three electron beams, may be employed to provide individual correction of beam misalignment, as disclosed in the aforementioned Friend article. However, where electromagnetic convergence apparatus is employed of the nature providing individual control of the three beams in respective radial directions relative to the tube axis a single beam alignment magnet providing control of a selected one of the beams in a direction perpendicular to the radial convergence control direction associated with that beam is sufficient. In such a case the single beam alignment magnet may, for example, take the form of an adjustably insertable magnet associated with cooperating external and internal pole pieces.

In addition to the beam controlling apparatus already described, the illustrated color kinescope 40 may also be provided with a "color purity" yoke (not illustrated) applying a uniform transverse magnetic field to all the electron beams to orient the system of beams as desired. The yoke may comprise either a rotatable single pair of coils, or two fixed pairs of coils at right angles, fed from an adjustable source of D.-C. (as indicated on the drawing). The use of such a "purity coil" to deflect the three beams equally so that they may be adjusted to pass through their respective color centers is explained in greater detail in the aforementioned Friend article.

The kinescope is provided, as is conventional, with a final accelerating electrode, the ultor 50, which may take the usual form of a conductive coating on the inner surface of the kinescope 40 extending from the vicinity of the convergence electrode 49 to the beam target structure 52. Where the flared portion of the kinescope envelope is itself a conducting metal, the conductive coating need only extend forward sufficiently to make electrical contact with the metal flared portion.

To achieve common deflection of the three beams to trace a scanning raster on the target structure 51 a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied. The horizontal yoke terminals H—H derive line frequency scanning waves from the horizontal output transformer 93 of the horizontal output system, which conventionally includes a horizontal output tube 61, energized by sawtooth voltage waves from generator 21 and developing a current which provides the desired scanning sawtooth in the horizontal yoke. To prevent the transient flyback pulses generated during retrace periods from setting up a series of oscillations, and in accordance with well-known reaction scanning principles, a damper tube 95 is provided.

The details of the yoke and damper connections and associated circuitry, including the provision of B-boost capacitors 90, horizontal linearity control 92, horizontal centering adjustment potentiometer 96, centering chokes 98, D.-C. blocking capacitors 100, etc., are illustrative only, and various modifications, augmentations, or revisions threof may be achieved without departing from the scope of the present invention relating particularly to the high voltage supply associated with the horizontal output transformer 93.

The high voltage supply illustrated in Figure 1 as associated with the horizontal output transformer 93 includes a first rectifier, diode 101. The anode of diode 101 is connected to terminal Z, the point of peak flyback pulse potential on the windings of the auto-transformer 93. The cathode of diode 101 is connected via a capacitor 103 to a point of reference potential (i. e. ground in the illustrative embodiment). Rectification of the flyback pulses appearing at terminal Z by the diode 101 provides a D.-C. output voltage at its cathode which is applied across a bleeder resistance 105. A potentiometer 107 serves as a resistance portion of the bleeder 105. The adjustable tap 108 of the potentiometer 107 is coupled to the focus electrodes 47 of the color kinescope 40.

The horizontal output transformer 93 is provided with a further secondary winding 93S. One end of the secondary winding 93 is directly connected to the cathode of the first rectifier 101. The other end of the secondary winding 93S is connected to the anode of the second rectifier, diode 113. The cathode of rectifier 113 is connected via a capacitor 115 to ground. The ultor electrode 50 of the color kinescope is supplied with the required final accelerating voltage via its connection to the cathode of the second rectifier 113.

To particularly point out the advantages of a high voltage supply connected as described above, it may be assumed, for example, that the voltage requirements of kinescope 40 are the aforementioned 27 kv. ultor voltage and a focus voltage adjustable about approximately 4 kv. In such a case, the step-up of flyback pulses in autotransformer 93 may be chosen to provide a D.-C. output at the cathode of rectifier 101 at a level of about 7 kv. While the setting of such a level for the first rectifier output requires voltage division in bleeder 105 to reach the desired adjustable focus range, it will be appreciated from the subsequent discussion that it is desirable to have the first rectifier output somewhat above the desired focus voltage range. It will be seen that the input to the second rectifier 113 thus includes a D.-C. voltage component of 7 kv. in addition to the flyback pulses developed across the secondary winding 93S. Thus, only a 20 kv. pulse is required of the secondary winding 93S to achieve a 27 kv. level at the output of rectifier 113.

An important result of utilizing the described manner of achieving a 27 kv. level at the output of rectifier 113 is that the peak inverse voltage on rectifier 113 is 20 kv., not 27 kv. From the viewpoint of rectifier size and expense, it is highly desirable to achieve such a reduction in the peak inverse voltage strain thereon. If conventional voltage doubler arrangements are employed in conjunction with the horizontal output transformer to develop a 27 kv. ultor voltage, a reduction in the peak inverse voltage strain could also be achieved, but at the expense of requiring three tubes for the ultor supply alone. In accordance with the embodiment of the present invention just discussed, however, a 27 kv. ultor voltage, as well as an adjustable 4 kv. focusing voltage are developed by a supply utilizing only two diodes, and in which neither of these diodes are required to withstand a peak inverse voltage comparable to the ultor voltage.

As is generally requisite in color television receiver high voltage supplies, the supply of Figure 1 is provided with means for regulating the voltage supplied to the ultor electrode 50. Specifically, the regulating means is illustrated as comprising a regulator tube 110, having its space discharge path shunting the ultor voltage output circuit of the supply and deriving a reference control voltage from the focus bleeder 105.

Figure 2:
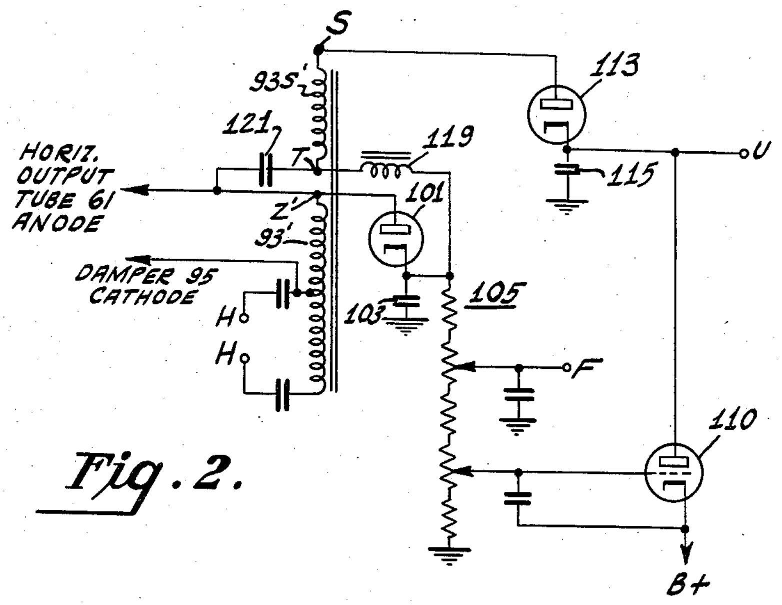
Figure 2 illustrates a high voltage supply in accordance with another embodiment of the present invention, which supply may be substituted for that shown in Figure 1 in satisfying the high voltage requirements of the receiver's color kinescope.

Another embodiment of the present invention is illustrated schematically in Figure 2. After an explanation of the circuit details of this second embodiment, a comparison will be made between the two to point out the particular advantages pertinant to each.

In the embodiment of Figure 2 the first rectifier 101 is connected to the high potential terminal Z′ of the horizontal output transformer primary winding 93′. The adjustable focus voltage is derived from the bleeder 105, shunting the output of rectifier 101, as in the first embodiment described. The D.-C. output of the first rectifier 101 is also applied via a choke 119 to the low potential terminal "T" of a secondary winding 93S′ of the output transformer. Terminal "T" is also connected by means of capacitor 121 to the high potential terminal Z′ of the primary winding. The anode of the second rectifier 113 is connected to the high potential terminal S of the secondary winding, and its rectifier D.-C. output is directly applied to the ultor electrode as previously.

It will be seen that in the embodiment of Figure 2, the flyback pulses appearing across the primary winding 93′, as well as the D.-C. output of rectifier 101, supplement the flyback pulses appearing across the secondary winding 93S′ in the input to the second rectifier 113. Again it will be seen that if a 7 kv. output for the first rectifier and a 27 kv. output for the second rectifier are assumed, the peak inverse voltage on the second rectifier is only 20 kv.

In comparing the two embodiments described, it will be noted that the embodiment of Figure 1 has the advantage of requiring no high voltage choke in the development of the supply voltages. On the other hand, it may be noted that the embodiment of Figure 2 requires fewer turns in the transformer windings to develop the same output voltages from the same level of energization. However, it may be noted that even the number of turns required for the transformer windings of the embodiment of Figure 1 are substantially less than those that would be required if it were sought to develop the same ultor voltage using a single rectifier. Also, as will be appreciated from what has been noted previously, use of the single rectifier to obtain the ultor output voltage would require a larger, more expensive rectifier (capable of withstanding a peak inverse voltage comparable to the ultor voltage required) than may be utilized as the second rectifier in accordance with the discussed embodiments of the present invention.

Figure 3:
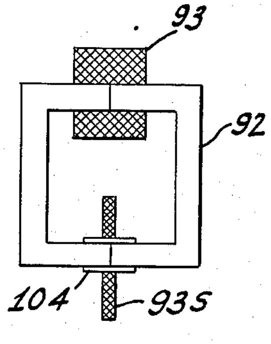
Figures 3 and 4 illustrate arrangements for disposing on a core the deflection wave output transformer windings utilized in the supply embodiment of Figures 1 and 2, respectively.
Figure 4:
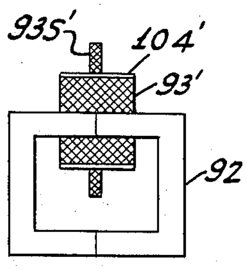

An advantage of the embodiment of Figure 2 over that of Figure 1 may be understood more clearly through reference to Figures 3 and 4, which illustrate respective physical arrangements of the respective transformer windings on a core that are feasible for the embodiment of Figures 1 and 2, respectively.

In Figure 3 the mounting of the horizontal output transformer "primary" winding 93 and the secondary winding 93S on a common ferrite core 92 is illustrated. It will be appreciated that the nature of the circuit arrangement of these windings illustrated in Figure 1 dictates mounting of the respective windings on separate "legs" of the core 92. Thus, in Figure 3 the primary winding 93 is disposed about one leg of the core 92, while the secondary winding 93S, which may be wound in the conventional "pie" form, is disposed about the opposite leg of the core 92. The secondary winding 93S is insulated from the core by suitable 7 kv. insulation, which may take the form, for example, of $\frac{1}{16}''$ Bakelite tubing, designated by the reference numeral 104. It will be appreciated that care must be taken in choosing the dimensions of the core 92 so that sufficient spacing exists between the outer windings of the secondary 93S and the primary winding 93, in order to avoid the possibility of arc-over therebetween.

In Figure 4, the mounting of the primary winding 93' and the secondary winding 93S' of the embodiment of Figure 2 is illustrated. It will be appreciated that the nature of the circuit arrangement of the windings as illustrated in Figure 2 permits the concentric disposition of these windings about the same leg of the core 92. Thus, in Figure 4, the primary winding 93' is disposed about a given leg of the core 92, the secondary winding 93S', preferably in "pie" form, is concentrically disposed about the primary winding 93', and suitable 7 kv. insulation 104', which may again be in the Bakelite tubing form described above, separates the two windings. With common leg mounting feasible for the transformer windings of Figure 2, it will be appreciated that the latter embodiment of the present invention readily permits of a more compact transformer assembly.

There have thus been described several embodiments of a high voltage supply which require only two rectifiers to develop the ultor and focus voltages required by a typical color kinescope. A saving of from one to two tubes may thus be effected over more conventional color kinescope high voltage supplies utilizing conventional or modified voltage doubler arrangements. Also, minimization of the peak inverse voltage strain on the rectifiers employed results in a saving in the expense and size of these rectifier devices. A further advantage over prior art high voltage supplies may be noted in the fact that the capacity reflected by the high voltage rectifier 113 in the described embodiments is reduced in magnitude with respect to more conventional supplies in which the ultor supplying rectifier must withstand a peak inverse voltage of the order of the delivered ultor voltage. This reduction in reflected capacity is significant, since the transformer resonant frequency is thereby increased, and the flyback pulse width thereby desirably reduced.

Having thus described the invention, what is claimed is:

1. In a cathode ray tube system, said cathode ray tube system including a deflection wave output transformer, a high voltage supply comprising in combination first flyback pulse rectifying means coupled to said transformer for developing a first unidirectional potential, second flyback pulse rectifying means, means for deriving stepped-up flyback pulses from said transformer, means for applying said stepped-up flyback pulses to the input of said second rectifying means, and means including said stepped-up flyback pulse deriving and applying means for applying the unidirectional potential output of said first rectifying means to the input of said second rectifying means whereby the output of said second rectifying means comprises a second unidirectional potential substantially corresponding to the sum of said first unidirectional potential and said stepped-up flyback pulse potential.

2. A high voltage supply in accordance with claim 1 wherein means are provided for coupling the input of said first rectifying means to the input of said second rectifying means.

3. A high voltage supply in accordance with claim 2 wherein said latter means comprises a D.-C. blocking capacitor.

4. In a color television receiver including a color kinescope requiring an ultor voltage of a first order, and a focus voltage of a second order, said receiver including a deflection wave output transformer, flyback pulses being periodically developed in said transformer, a high voltage supply comprising in combination means for deriving flyback pulses of a first peak potential from said transformer, a first rectifier having an input circuit and an output circuit, means for applying said flyback pulses of said first peak potential to the input circuit of said first rectifier, means for deriving a voltage of said second order from the output circuit of said first rectifier, a second rectifier having an input circuit and an output circuit, means for deriving flyback pulses of a peak potential higher than said first peak potential from said transformer, means for applying said flyback pulses of said higher peak potential to the input circuit of said second rectifier, means including said latter flyback pulse deriving means for coupling the output circuit of said first rectifier to the input circuit of said second rectifier, and means for deriving a voltage of said first order from the output circuit of said second rectifier.

5. A high voltage supply in accordance with claim 4 also including means for applying said flyback pulses of said first peak potential to the input circuit of said second rectifier.

6. A high voltage supply in accordance with claim 5 wherein said means for coupling the output circuit of said first rectifier to the input circuit of said second rectifier also includes a high voltage choke.

7. A high voltage supply in accordance with claim 5 wherein said last-named flyback pulse applying means comprises a capacitor coupling the input circuit of said first rectifier to the input circuit of said second rectifier.

8. In a color television receiver including a color kinescope requiring an ultor voltage of a first order and a focus voltage of a second order, said receiver including a deflection wave output transformer having a secondary winding, flyback pulses being periodically developed in said transformer and appearing with stepped-up potential across said secondary winding, a high voltage supply comprising in combination of first rectifier coupled to said transformer for rectifying said flyback pulses to develop an output voltage of said second order, a second rectifier having an input circuit and an output circuit, said second rectifier being coupled to said secondary winding whereby said flyback pulses of stepped-up potential are retified by said second rectifier, means including said secondary winding for applying the output voltage of said second order to the input circuit of said second rectifier, and means for deriving an output voltage of said first order from the output circuit of said second rectifier.

9. A high voltage supply in accordance with claim 8 including capacitive means for coupling the input of said first rectifier to the input circuit of said second rectifier, and wherein said means for applying the output voltage of said second order to said second rectifier input circuit also includes an inductive choke.

References Cited in the file of this patent

UNITED STATES PATENTS 2,553,323 Ford ________________ May 15, 1951